(12) United States Patent
Li et al.

(10) Patent No.: US 9,450,843 B2
(45) Date of Patent: Sep. 20, 2016

(54) METHOD FOR INDICATING PORT STATES AND SWITCH

(71) Applicant: Huawei Technologies Co., Ltd., Shenzhen, Guangdong (CN)

(72) Inventors: Guolang Li, Shenzhen (CN); Xiaobin Wang, Shenzhen (CN); Xiang Zhou, Shenzhen (CN); Xizhi Jia, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 168 days.

(21) Appl. No.: 13/794,050

(22) Filed: Mar. 11, 2013

(65) Prior Publication Data

US 2013/0265882 A1 Oct. 10, 2013

(30) Foreign Application Priority Data

Mar. 21, 2012 (CN) .......................... 2012 1 0076443

(51) Int. Cl.
*H04L 12/26* (2006.01)
*H04L 12/931* (2013.01)

(52) U.S. Cl.
CPC .......... *H04L 43/0805* (2013.01); *H04L 49/40* (2013.01)

(58) Field of Classification Search
None
See application file for complete search history.

(56) References Cited

U.S. PATENT DOCUMENTS

| 2007/0174528 A1* | 7/2007 | Mantver ................ G06F 1/266 710/100 |
| 2011/0208963 A1* | 8/2011 | Soffer .......................... 713/168 |
| 2011/0267191 A1* | 11/2011 | Slepov ................... H04L 49/40 340/540 |
| 2013/0265882 A1* | 10/2013 | Li ........................... H04L 49/40 370/241 |

FOREIGN PATENT DOCUMENTS

| CN | 1725704 A | 1/2006 |
| CN | 101262364 A | 9/2008 |
| KR | 20000039062 A | 7/2000 |

OTHER PUBLICATIONS

Extended European Search Report in corresponding European Patent Application No. 13154511.3 (May 22, 2013).
"InfiniScale IV 8-Port QSFP 40 GB/s InfiniBand Switch User Manual," Jan. 1, 2012, Rev 1.4, Mellanox Technologies, Sunnyvale, California.
"IS5022—8-port Non-blocking Unmanaged 40GB/s InfiniBand Switch System," 2011, Mellanox Technologies, Sunnyvale, California.

* cited by examiner

*Primary Examiner* — Adnan Baig
(74) *Attorney, Agent, or Firm* — Leydig, Voit & Mayer, Ltd.

(57) ABSTRACT

The present disclosure discloses a method for indicating port states and a switch. A main panel of the switch is provided with port indicators one-to-one corresponding to physical ports and N channel indicators. The switch further includes a main chip and a control component. The control component is configured to: receive a port state indication signal from the main chip, and parse the port state indication signal to obtain usage state information of each logical port; generate N enable signals, and control at most one enable signal to be valid at any time point; and control the states of the N channel indicators by using the N enable signals sent from the enable signal controlling module, and control the state of each port indicator according to the N enable signals and the usage state information of each logical port.

16 Claims, 5 Drawing Sheets

METHOD FOR INDICATING PORT STATES AND SWITCH

CROSS-REFERENCE TO RELATED APPLICATION

This application claims priority to Chinese Patent Application No. 201210076443.X, filed on Mar. 21, 2012, which is hereby incorporated by reference in its entirety.

FIELD

The present disclosure relates to the technical field of switches, and in particular, to a method for indicating port states and a switch.

BACKGROUND

With the constant development of networks (3G, video services, and the like), enterprises and operators have higher requirements for bandwidth. This means that a switch needs to bear a larger switching capacity. Therefore, high-speed and high-density output has become a development trend of core switches.

A switch with high-density ports provides higher bandwidths by adding the number of ports, for example, one board is configured with 48 ports, 96 ports, or 192 ports. In addition, a switch with high-speed ports provides higher bandwidths by increasing transmission rates of ports. At present, a 10G port is gradually increased to 40G/100G, so that the unit port transmission rate is increased by 4/10 times. Because a 10G switching port is being in transition to a 40G/100G switch in the field, a 10G/40G switch (that is, a switch supporting transmission rates of both 10G and 40G) and a 10G/100G switch (that is, a switch supporting transmission rates of both 10G and 100G) appear.

Switches using the foregoing two types of ports generally adopt the form that a physical port includes N (N≥2) channels (abbreviated as 1-to-N form). For example, a QSFP (quad small form-factor pluggable) includes four channels, and a CXP (12× eXtended-capability pluggable form-factor) includes 12 channels; if one channel of a port needs to be connected, each of the channels may be led out from this port by using a 1-to-N connector to connect the channel. However, with regard to switches in the 1-to-N form, if the connection state of each of the channels of each port needs to be displayed, a great number of indicators are needed and a limited panel space may be occupied.

SUMMARY

Embodiments of the present disclosure provide a method for indicating port states and a switch, to display all port states of a switch in the 1-to-N form by using only a few indicators, so that the panel space occupied by the indicators is saved and costs are reduced.

A first aspect of the present disclosure provides a switch, provided with at least two physical ports on its main panel, where each physical port includes N channels, where N≥2, and the main panel is provided with port indicators one-to-one corresponding to the physical ports and N channel indicators, the N channel indicators being respectively corresponding to the N channels of each physical port. The switch further includes a main chip and a control component, where the main chip is provided with logical ports corresponding to each of the channels and the control component includes a signal parsing module, an enable signal controlling module, and an indicator controlling module.

The signal parsing module is configured to receive a port state indication signal from the main chip and parse the port state indication signal to obtain usage state information of each logical port.

The enable signal controlling module is configured to generate N enable signals and control at most one enable signal to be valid at any time point.

The indicator controlling module is configured to control the states of the N channel indicators by using the N enable signals sent from the enable signal controlling module, and control the state of each port indicator according to the N enable signals and the usage state information of each logical port.

A second aspect of the present disclosure further provides a method for indicating port states applied in a switch, where the switch includes at least two physical ports, each physical port including N channels, where N≥2, and the switch further includes port indicators one-to-one corresponding to the physical ports and N channel indicators; the N channel indicators being respectively corresponding to the N channels of each physical port.

The method includes: receiving a port state indication signal from a main chip, and parsing the port state indication signal to obtain usage state information of each logical port;

generating N enable signals, and controlling at most one enable signal to be valid at any time point; and controlling the states of the N channel indicators by using the N enable signals, and controlling the state of each port indicator according to the N enable signals and the usage state information of each logical port.

By using the method for indicating port states and the switch provided in the present disclosure, an indicator controlling module in a control component controls the states of the channel indicators by using enable signals, and controls the state of each port indicator by using the enable signals and usage state information of each logical port. In this way, the states of both the port indicators and the channel indicators are displayed, so that users can know the usage states of all channels. For example, if a switch includes M (M≥2) physical ports, with each physical port including N (N≥2) channels, and each of the channels corresponds to one logical port on a main chip, M*N indicators are needed to indicate all the port states in the prior art, while in the present disclosure, the states of M*N logical ports can be indicated through just M+N indicators. Because M+N≤M*N and N is generally greater than 2, by using the solution of the present disclosure, panel space occupied by the indicators can be saved and costs can be reduced.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and persons of ordinary skill in the art may still derive other drawings from these accompanying drawings without making creative efforts.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by persons of ordinary skill in the art based on the embodiments of the present disclosure without creative efforts shall fall within the protection scope of the present disclosure.

An embodiment of the present disclosure provides a switch in the 1-to-N form, provided with at least two physical ports on its main panel, where each physical port includes N channels, where N≥2, and the main panel is further provided with port indicators one-to-one corresponding to the physical ports and N channel indicators, the N channel indicators being respectively corresponding to the N channels of each physical port. For convenience of description, in embodiments of the present disclosure, M is used to identify the number of physical ports and M≥2; the number of port indicators is also M according to the fact that the port indicators are one-to-one corresponding to the physical ports. Further, preferably, a button for manually controlling the states of the channel indicators may be set on the switch.

The switch in the 1-to-N form further includes a main chip, where the main chip is provided with logical ports corresponding to each of the channels. In an implementation, the number of physical ports is M, and the physical ports are numbered from 1 to M; each physical port has N channels, which are numbered from 1 to N; because logical ports corresponding to each of the channels need to be set on the main chip, M*N logical ports need to be provided on the main chip, which are numbered from 1 to M*N. For the convenience of description, in the embodiments of the present disclosure, a physical port i (1≤i≤M) indicates a physical port numbered i, a channel j (1≤j≤N) indicates a channel numbered j, and a logical port k (1≤k≤M*N) indicates a logical port numbered k. It should be noted that each physical port includes the channel j (1≤j≤N). In addition, the M port indicators are numbered from 1 to M, and a port indicator m (1≤m≤M) indicates a port indicator numbered m; the N channel indicators are numbered from 1 to N, and a channel indicator n (1≤n≤N) indicates a channel indicator numbered n.

Figure 1:
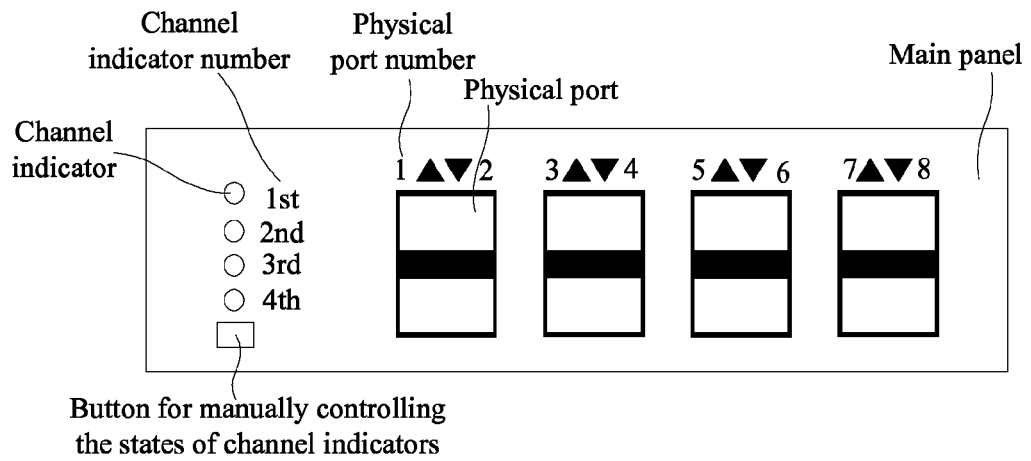
FIG. 1 is a schematic diagram illustrating a main panel of a switch according to an embodiment of the present disclosure.

Referring to FIG. 1, an QSFP is taken as an example for illustration. The QSFP illustrated in FIG. 1 is a switch in the 1-to-4 form and includes: eight physical ports, numbered from 1 to 8; eight port indicators, one-to-one corresponding to the eight physical ports, where each port indicator may be set at one side of each physical port or inside each physical port; four channel indicators; and a button for manually controlling the states of the channel indicators set according to a preferential solution. An example that the port indicators are set inside the physical ports is taken in FIG. 1. In this way, space of the main panel occupied by the port indicators can be reduced, so that no port indicator is marked in the front view illustrated in FIG. 1.

For better description of a mapping among the physical ports, channels, logical ports, channel indicators, and port indicators, exemplarily, as shown in Table 1, in the embodiments of the present disclosure, a physical port 1 corresponds to logical ports 1 to N of the main chip, a physical port 2 corresponds to logical ports N+1 to 2N of the main chip, and the rest may be deduced by analogy; a physical port M corresponds to logical ports (M−1)*N+1 to M*N of the main chip; and channels 1 to N included in each physical port correspond to N logical ports corresponding to each physical port respectively. The port indicators one-to-one correspond to the physical ports, and the N channel indicators correspond to the N channels of each physical port respectively.

TABLE 1

| Physical port | Channel | Logical port | Port indicator | Channel indicator |
|---|---|---|---|---|
| 1 | 1 to N | 1 to N | 1 | 1 to N |
| 2 | 1 to N | N + 1 to 2N | 2 | |
| ... | ... | ... | ... | |
| M | 1 to N | (M − 1) * N + 1 to M * N | M | |

In addition, the state of a channel indicator is used to indicate which channel is indicated currently; the state of a port indicator is used to indicate the states of the currently indicated channel in each physical port. Exemplarily, if a channel indicator 1 is ON, it indicates that a channel 1 is currently indicated, and at this time, the state of each port indicator indicates the usage state of the channel 1 of each physical port 1. For example, if a port indicator 1 is ON and a port indicator 2 is OFF, it indicates that the channel 1 of a physical port 1 is in a using state and the channel 1 of a physical port 2 is in an unused state. In the embodiments of the present disclosure, the using state refers to a normal connection state, and the unused state includes a disconnection state due to being disconnected and such faults as poor contact while being connected; and the usage state of a channel of a physical port is the same as the usage states of logical ports corresponding to the physical port.

Figure 2:
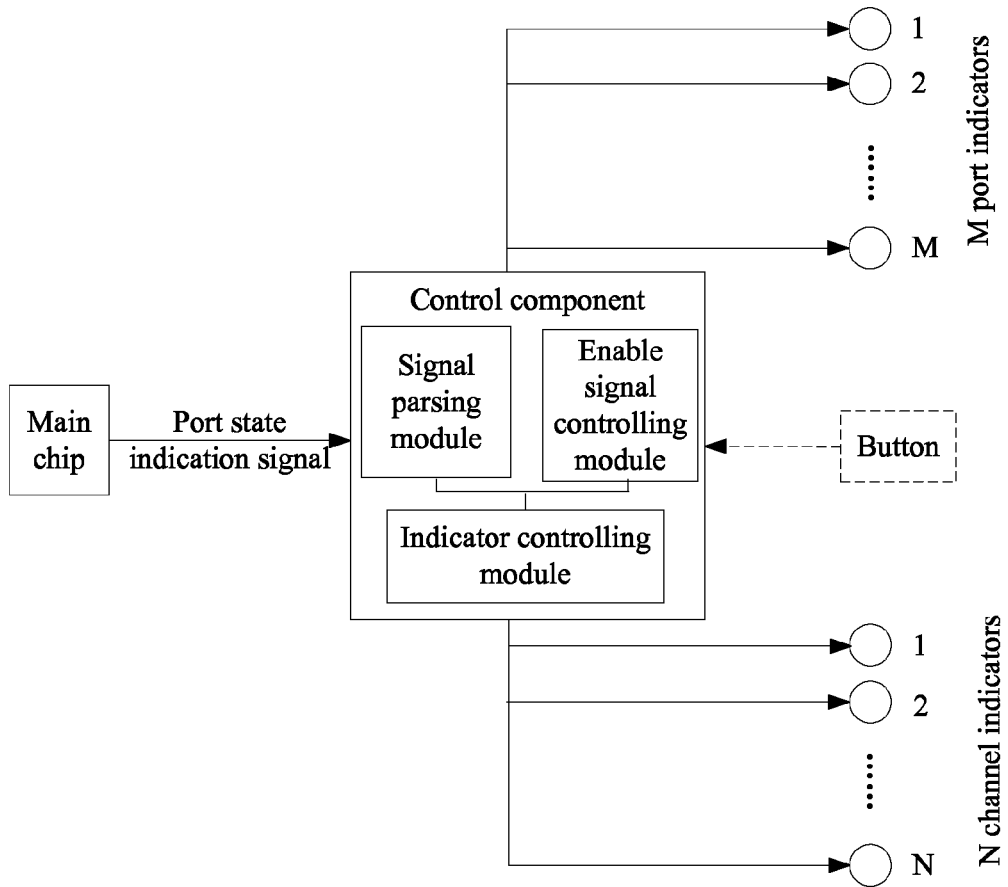
FIG. 2 is a first schematic diagram illustrating a connection relationship between parts of a switch according to an embodiment of the present disclosure.

Referring to FIG. 2, it can be seen that a switch in the 1-to-N form further includes a control component, where the control component includes a signal parsing module, an enable signal controlling module, and an indicator controlling module.

The signal parsing module is configured to receive a port state indication signal from a main chip and parse the port state indication signal to obtain usage state information of each logical port; the enable signal controlling module is configured to generate N enable signals and control at most one enable signal to be valid at any time point; the indicator controlling module is configured to control the states of the N channel indicators by using the N enable signals sent from the enable signal controlling module and control the state of each port indicator according to the N enable signals and the usage state information of each logical port.

According to a connection relationship between parts of the switch illustrated in FIG. 2, the main chip is connected to the control component; the main chip is configured to send a port state indication signal to the control component, and may send a port state indication signal to the signal parsing module in the control component; the control component is also connected to M port indicators and N channel indicators so that the usage states of M*N logical ports, that is, all the logical ports, are indicated by using the M+N indicators; further, a button for manually controlling the states of the channel indicators is also set according to the switch of the preferential solution, where the button is also connected to the control component, so that users selectively know port states according to their actual needs.

Figure 3:
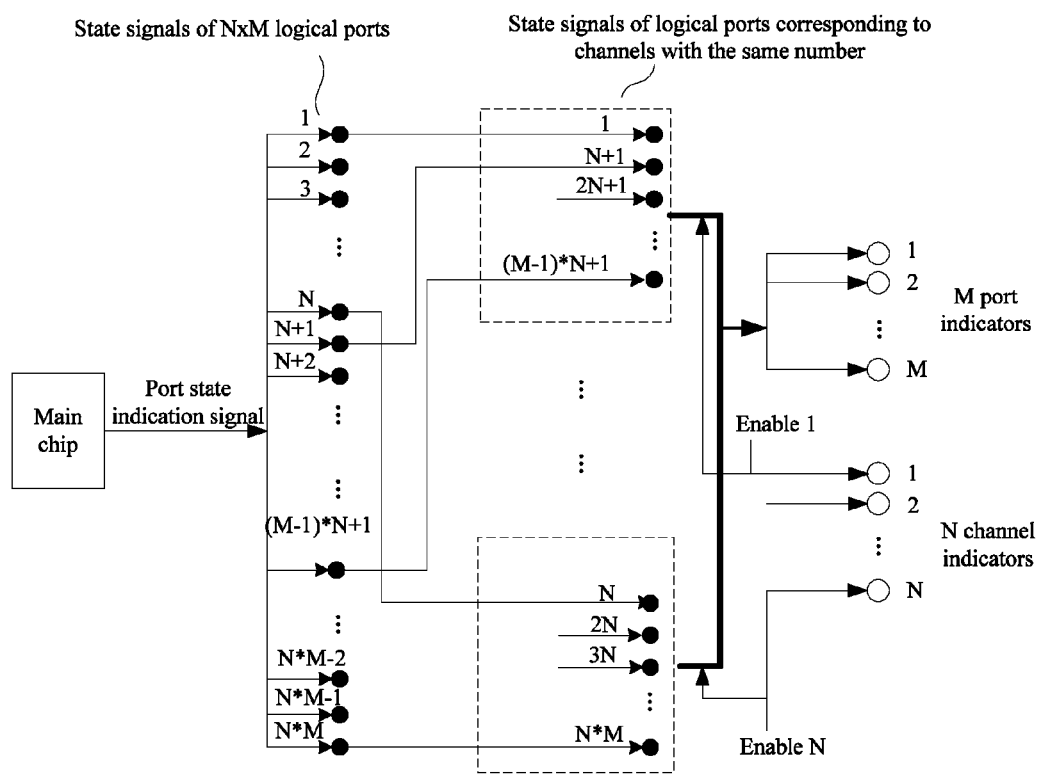
FIG. 3 is a schematic diagram illustrating the principle of controlling of indicators of a switch according to an embodiment of the present disclosure.

Based on the foregoing connection relationship and by referring to the schematic diagram illustrating the principle of a control component illustrated in FIG. 3, to enable the control component to indicate the usage states of M*N logical ports by using M+N indicators, preferentially, the indicator controlling module is configured to: when one of N enable signals is valid and the other enable signals are invalid, control a channel indicator corresponding to the valid enable signal to be in a first state and the other channel indicators to be in a second state; if a logical port corresponding to the valid enable signal is in a using state, control a port indicator of a physical port corresponding to the logical port in the using state to be in the first state; and if a logical port corresponding to the valid enable signal is in an unused state, control a port indicator of a physical port corresponding to the logical port in the unused state to be in the second state; and when the N enable signals are all invalid, control all the channel indicators to be in the second state; and if all logical ports corresponding to a physical port are in the using state, control a port indicator of the physical port to be in the first state; if any one logical port corresponding to a physical port is in the unused state, control a port indicator of the physical port to be in the second state.

It should be noted that, in all the embodiments of the present disclosure, the indicators include ON and OFF states and according to a common indication mode, the first state may be ON and the second state may be OFF.

In FIG. 3, an Enable 1 to an Enable N are used to indicate the N enable signals, and the N enable signals control the states of the N channel indicators, and at most one enable signal is valid at any time point. A signal parsing module in the control component parses the port state indication signal sent from the main chip to obtain usage state information of each logical port, that is, to obtain the usage state information of the M*N logical ports. The N enable signals control the states of the N channel indicators in a one-to-one manner. In this embodiment, an $i^{th}$ enable signal ($1 \leq i \leq N$) Enable i controls the state of a channel indicator i. When the Enable i of the N enable signals generated by the enable signal controlling module is valid and the other enable signals are invalid, the indicator controlling module controls the channel indicator i to be in the first state and the other channel indicators to be in the second state. At this time, the channel indicator i indicates the states of a channel i of each physical port. In addition, the indicator controlling module controls the states of M port indicators according to the usage state of a logical port corresponding to an $i^{th}$ channel of each physical port in the usage states of M*N logical ports, that is, the usage states of logical ports i, N+i, 2N+i, . . . , and (M−1)*N+i. If a logical port is in the using state, the indicator controlling module controls a port indicator corresponding to the logical port to be in the first state; if a logical port is in the unused state, the indicator controlling module controls a port indicator corresponding to the logical port to be in the second state. When the N enable signals generated by the enable signal controlling module are all invalid, the indicator controlling module controls all the channel indicators to be in the second state, which may indicate the state of a channel (abbreviated as aggregated channel) aggregated by all channels of the same physical port; if all logical ports corresponding to a physical port j ($1 \leq j \leq M$) are in the using state, the indicator controlling module controls a port indicator of the physical port j to be in the first state; if any one logical port corresponding to the physical port j is in the unused state, the indicator controlling module controls a port indicator of the physical port j to be in the second state.

Exemplarily, if the Enable 1 is valid and the other enable signals are invalid, and according to the port state indication signal, if the logical port 1 corresponding to the Enable 1 is in the using state and a logical port N+1 corresponding to the Enable 1 is in the unused state. At this time, the channel indicator 1 is ON and other channel indicators are OFF, it indicates that the usage state of channel 1 of each of the physical ports is currently indicated; and the port indicator 1 is ON and the port indicator 2 is OFF, it indicates that channel 1 in the physical port 1 is in the using state and channel 1 in the physical port 2 is in the unused state currently.

Exemplarily still, if all the channel indicators are OFF, the port indicator 1 is ON, and the port indicator 2 is OFF, it indicates that the usage state of each aggregated channel is currently indicated and the aggregated channel of the physical port 1 is in the using state, that is, the N channels of the physical port 1 are in the using state, and the aggregated channel of the physical port 2 is in the unused state, that is, at least one of the N channels of the physical port 2 is in the unused state.

Figure 4:
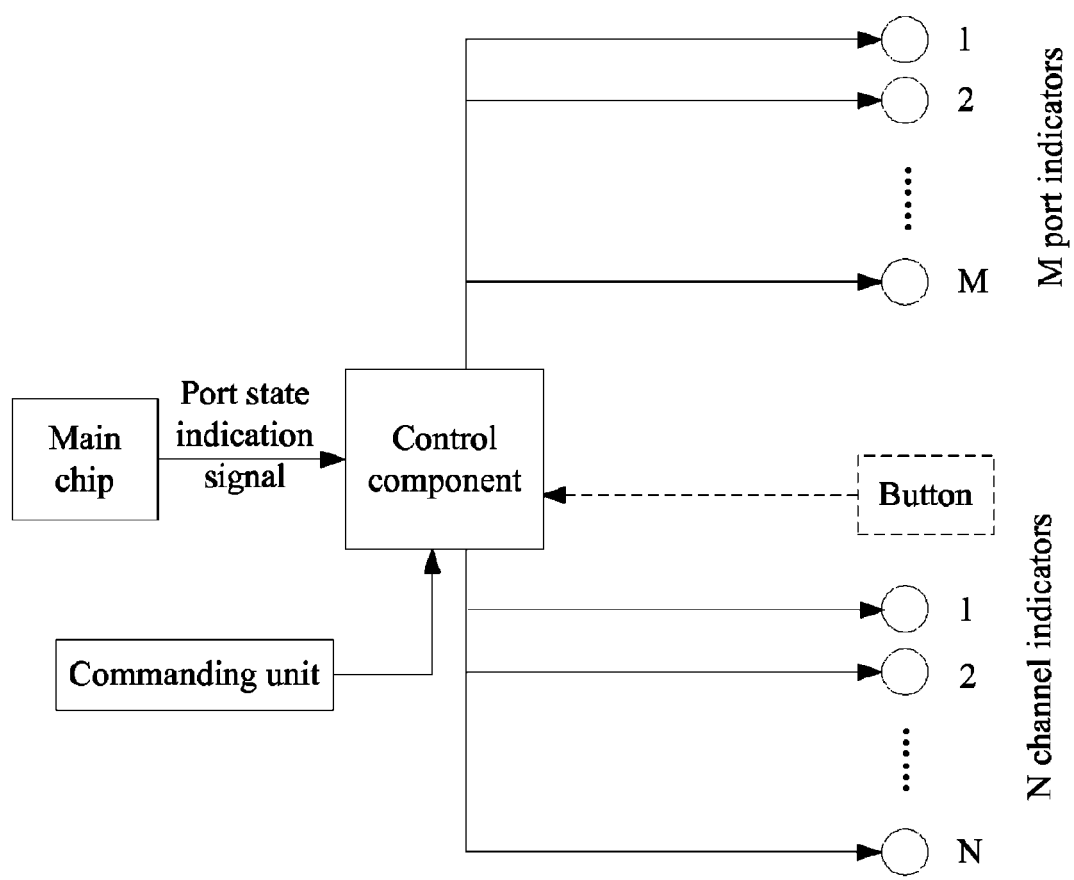
FIG. 4 is a second schematic diagram illustrating a connection relationship between parts of a switch according to an embodiment of the present disclosure.

Further, the controlling the N enable signals may adopt any one of the following solutions:

Solution A: Referring to FIG. 4, the switch further includes a commanding unit. Exemplarily, the commanding unit is set outside the control component, and for example, is set on the host of the switch. However, the commanding unit is not limited to that illustrated in the figure, for example, the commanding unit may be set inside the control component.

The commanding unit is configured to send a scheduled switching command to the enable signal controlling module. Exemplarily, the commanding unit sends a switching command to an enable signal controlling module every t1 seconds.

The enable signal controlling module is configured to: generate N enable signals; when receiving a switching command, control, according to a preset sequence, one of the N enable signals to be valid and the other enable signals to be invalid, or control all the enable signals to be invalid. The preset sequence may be any sequence of channel indicator numbers. As an example in the embodiment of the present disclosure, the preset sequence refers to the sequence of the channel indicator numbers in an ascending order, that is, a sequence from Enable 1 to Enable N. Exemplarily, when receiving a switching command for the first time, the enable signal controlling module controls the Enable 1 to be valid for a duration of t1 seconds and the other enable signals to be invalid; when receiving a switching command for the second time, the enable signal controlling module controls an Enable 2 to be valid for a duration of t1 seconds and the other enable signals to be invalid; the rest may be deduced by analogy; when receiving a switching command for the $N^{th}$ time, the enable signal controlling module controls the Enable N to be valid for a duration of t1 seconds and the other enable signals to be invalid; further, when receiving a switching command for the $(N+1)^{th}$ time, the enable signal controlling module may switch all the enable signals to be invalid to indicate the usage states of aggregated channels; when receiving a switching command next time, the enable signal controlling module re-controls the Enable 1 to be valid and the other enable signals to be invalid, so as to start a new cycle.

Figure 5:
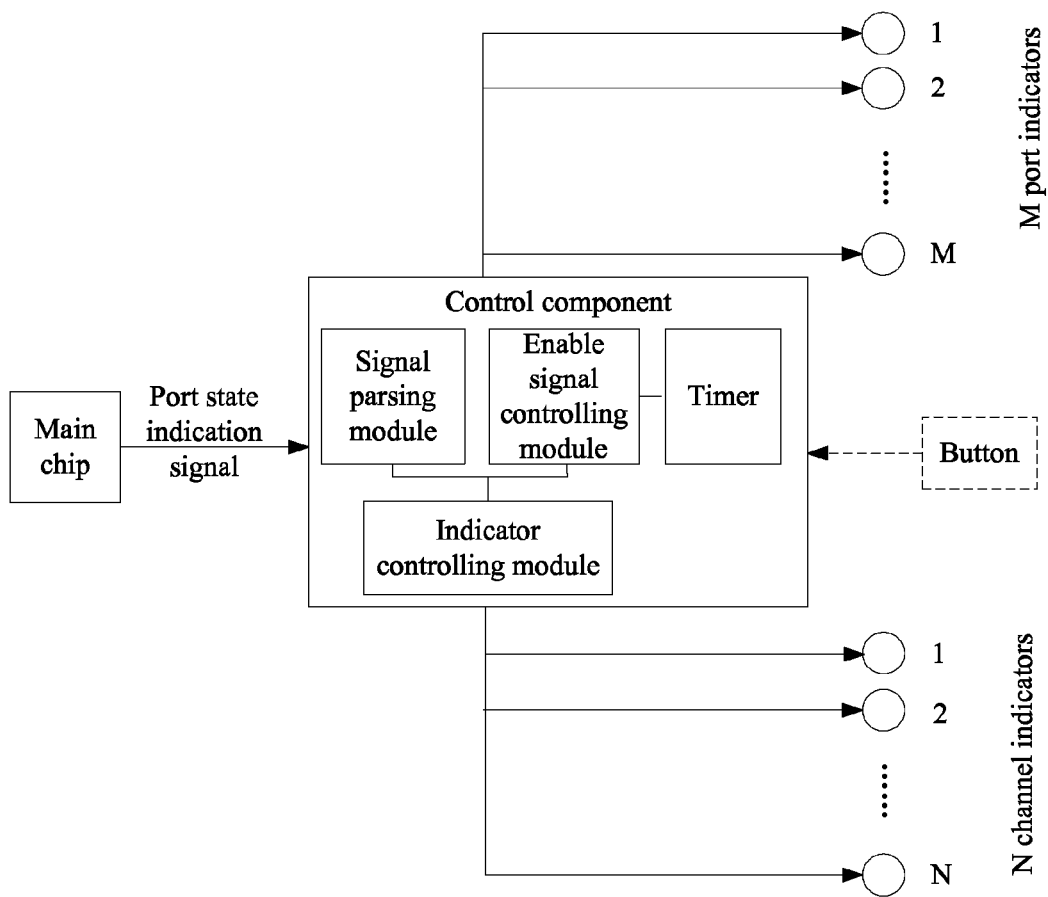
FIG. 5 is a third schematic diagram illustrating a connection relationship between parts of a switch according to an embodiment of the present disclosure.

Solution B: Referring to FIG. 5, a control component of the switch may further include a timer configured to set a preset time. Exemplarily, the preset time is t2 seconds.

The enable signal controlling module is configured to: generate N enable signals; each time when the timer reaches the preset time of t2 seconds, control, according to a preset sequence, one of the N enable signals to be valid and the other enable signals to be invalid, or control all the enable signals to be invalid. For details about the preset sequence, reference may be made to the description of the foregoing solution A, which is not further described herein. Exemplarily, when the switch is powered on, the timer is started and the enable signal controlling module may control an Enable 1 to be valid for a duration of t2 seconds and the other enable signals to be invalid; when the timer reaches t2 seconds, the enable signal controlling module controls an Enable 2 to be valid for a duration of t2 seconds and the other enable signals to be invalid; the rest may be deduced by analogy; until the enable signal controlling module controls an Enable N to be valid for a duration of t2 seconds and the other enable signals to be invalid. Further, when the timer reaches t2 seconds next time, the enable signal controlling module switches all the enable signals to be invalid to indicate the usage states of aggregated channels; when the timer reaches t2 seconds next time, the enable signal controlling module re-controls the Enable 1 to be valid and the other enable signals to be invalid, so as to start a new cycle.

The foregoing two solutions are based on the fact that the switch indicates the usage states of M*N logical ports by using M+N indicators in an automatic mode.

If the switch further supports a manual mode so that the switch may present the usage states of each logical port according to a need of a user, referring to FIG. 2, the switch further includes a button for manually controlling the states of the channel indicators, where the button for manually controlling the states of the channel indicators is configured to: when being pressed one time by a user, send a switching signal to the enable signal controlling module; at this time, the enable signal controlling module is configured to: generate N enable signals; and when receiving a switching signal from the button, control, according to a preset sequence, one of the N enable signals to be valid and the other enable signals to be invalid, or control all the enable signals to be invalid. For details about the preset sequence, reference may be made to the description of the foregoing solution A, which is not further described herein. Exemplarily, the default state of the switch may be automatic mode. When the button for manually controlling the states of the channel indicators is triggered by the user for the first time, the switch may enter the manual mode, and when receiving a switching signal from the button for the first time, the enable signal controlling module may control Enable 1 to be valid until a switching signal is received next time and the other enable signals to be invalid; when receiving a switching signal from the button for the second time, the enable signal controlling module controls Enable 2 to be valid until a switching signal is received next time and the other enable signals to be invalid; the rest may be deduced by analogy; when receiving a switching signal for the $N^{th}$ time, the enable signal controlling module controls an Enable N to be valid until a switching signal is received next time and the other enable signals to be invalid; further, when receiving a switching signal for the $(N+1)^{th}$ time, the enable signal controlling module may switch all the enable signals to be invalid to indicate the usage states of aggregated channels; when receiving a switching signal next time, the enable signal controlling module re-controls the Enable 1 to be valid and the other enable signals to be invalid, so as to start a new cycle.

The foregoing automatic mode may be used as the default mode of the switch. When the button for manually controlling the states of the channel indicators of the switch is triggered by a user, the switch may enter the manual mode; when the switch is in the manual mode but is not triggered for a long time, for example, the button is not triggered within T seconds, the switch automatically transfers from the manual mode to the automatic mode.

In addition, in all the embodiments of the present disclosure, the control component is preferentially a CPLD (complex programmable logic device).

By using the switch provided in the embodiment of the present disclosure, a control component controls the states of the channel indicators by using enable signals, and controls the states of the channel indicators according to the enable signals and usage state information of each logical port. In this way, users can know the usage states of all channels according to the displaying states of the port indicators and channel indicators. In this way, the states of M*N logical ports may be indicated by using just M+N indicators. Therefore, with the solution of the present disclosure, panel space occupied by the indicators can be saved and costs can be reduced.

An embodiment of the present disclosure also provides a method for indicating port states applied in a switch, where the switch includes at least two physical ports, each physical port including N channels, where N≥2, and further includes port indicators one-to-one corresponding to the physical ports and N channel indicators, the N channel indicators being respectively corresponding to the N channels of each physical port.

Figure 6:
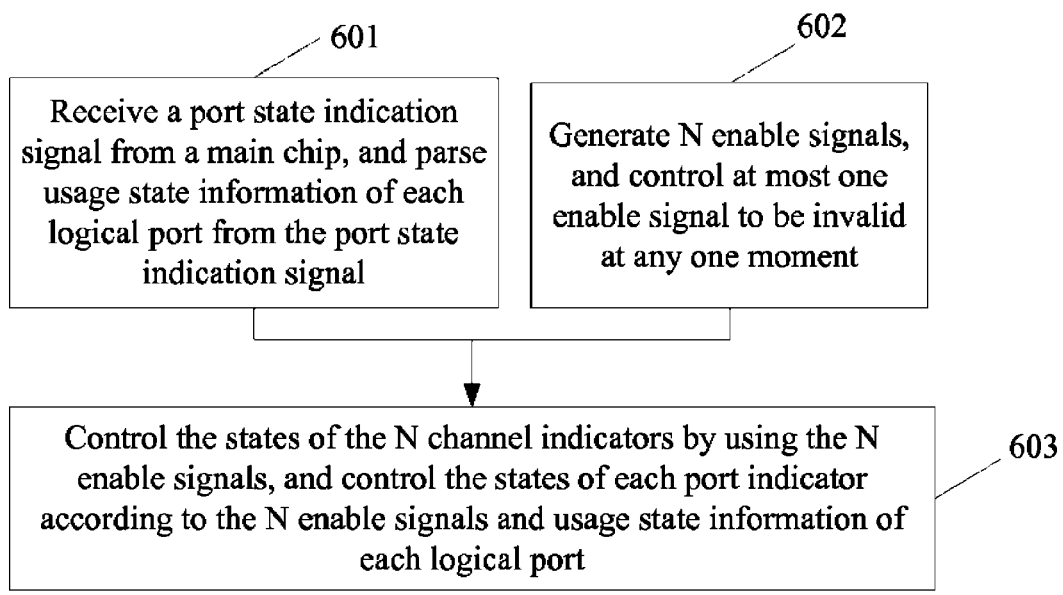
FIG. 6 illustrates a method for indicating port states according to an embodiment of the present disclosure.

Referring to FIG. 6, the method includes:

Step 601: Receive a port state indication signal from a main chip, and parse the port state indication signal to obtain usage state information of each logical port.

Step 602: Generate N enable signals, and control at most one enable signal to be valid at any time point.

Optionally, if the switch is in automatic mode, the controlling at most one enable signal to be valid at any time point may be as follows: When a scheduled command sent internally from the switch is received, one of the N enable signals is controlled to be valid and the other enable signals are controlled to be invalid according to a preset sequence, or all the enable signals are controlled to be invalid. For this mode, reference may be made to the foregoing solution A, which is not further described herein.

Optionally, if the switch is in an automatic mode, the controlling at most one enable signal to be valid at any time point may be as follows: Each time when a preset time is reached, one of the N enable signals is controlled to be valid and the other enable signals are controlled to be invalid according to a preset sequence, or all the enable signals are controlled to be invalid. For this mode, reference may be made to the foregoing solution B, which is not further described herein.

Optionally, if the switch is in a manual mode, the controlling at most one enable signal to be valid at any time point may be as follows: When a switching signal manually sent from a user is received, one of the N enable signals is controlled to be valid and the other enable signals are controlled to be invalid according to a preset sequence, or all the enable signals are controlled to be invalid. For this mode, reference may be made to the foregoing descriptions abut how the enable signal controlling module controls enable signals in the manual mode, which is not further described herein.

It should be noted that the foregoing step 601 and step 602 do not embody a sequence preference and the two steps may be considered to be performed at the same time. In addition, in all the embodiments of the present disclosure, the executive subject of all steps is the control component in the switch.

Step 603: Control the states of the N channel indicators by using the N enable signals, and control the state of each port indicator according to the N enable signals and the usage state information of each logical port.

This step may include:

when one of the N enable signals is valid and the other enable signals are invalid, controlling a channel indicator corresponding to the valid enable signal to be in a first state and the other channel indicators to be in a second state; and if a logical port corresponding to the valid enable signal is in an using state, controlling a port indicator of a physical port corresponding to the logical port in the using state to be in the first state; if a logical port corresponding to the valid enable signal is in an unused state, controlling a port indicator of a physical port corresponding to the logical port in the unused state to be in the second state; and when the N enable signals are all invalid, controlling all the channel indicators to be in the second state, and if all logical ports corresponding to a physical port are in the using state, controlling a port indicator of the physical port to be in the first state; if any one logical port corresponding to a physical port is in the unused state, controlling a port indicator of the physical port to be in the second state.

By using the method for indicating port states provided in this embodiment, a control component controls the states of the channel indicators by using enable signals, and controls the states of the channel indicators according to the enable signals and usage state information of each logical port. In this way, users can know the usage states of all channels according to the displaying states of the port indicators and channel indicators. In this way, the states of M*N logical ports may be indicated by using only M+N indicators. Therefore, with the solution of the present disclosure, panel space occupied by the indicators can be saved and costs can be reduced.

Through the foregoing description of the embodiments, it is clear to persons skilled in the art that the present disclosure may be implemented by software plus necessary universal hardware, and definitely may also be implemented by hardware, but in many cases, the software implementation is preferred. Based on such an understanding, the technical solutions of the present disclosure essentially, or the part contributing to the prior art may be implemented in the form of a software product. The computer software product is stored in a readable storage medium, for example, a floppy disk, hard disk, or optical disk of the computer, and includes several instructions for instructing a computer device (which may be a personal computer, a server, a network device, and the like) to perform the methods described in the embodiments of the present disclosure.

The foregoing descriptions are merely specific embodiments of the present disclosure, but are not intended to limit the protection scope of the present disclosure. Any variation or replacement readily figured out by persons skilled in the art within the technical scope of the present disclosure shall fall within the protection scope of the present disclosure. Therefore, the protection scope of the present disclosure shall be subject to the protection scope claimed by the claims.

The invention claimed is:

1. A switch, provided with M physical ports on its main panel, and each physical port of the M physical ports comprising N channels, thus the switch comprises M*N channels, where N≥2 and M≥2, wherein the main panel is provided with M port indicators one-to-one corresponding to the M physical ports, and the main panel is provided further with N channel indicators, the N channel indicators being respectively corresponding to the N channels of each physical port, and the M port indicators and the N channel indicators are used to indicate states of the M*N channels; wherein the switch further comprises a main chip and a control component, wherein the main chip is provided with M*N logical ports corresponding to each of the M*N channels, and the control component comprises a signal parsing module, an enable signal controlling module, and an indicator controlling module, wherein:

the signal parsing module is configured to receive a port state indication signal from the main chip and parse the port state indication signal to obtain usage state information of each logical port;

the enable signal controlling module is configured to generate N enable signals and control at most one enable signal to be valid at any time point; and the indicator controlling module is configured to control the states of the N channel indicators by using the N enable signals sent from the enable signal controlling module, and control the state of each port indicator according to the N enable signals and the usage state information of each logical port.

2. The switch according to claim 1, wherein the indicator controlling module is configured to: when one of the N enable signals is valid and the other enable signals are invalid, control a channel indicator corresponding to the valid enable signal to be in a first state and the other channel indicators to be in a second state; and if a logical port corresponding to the valid enable signal is in an using state, control a port indicator of a physical port corresponding to the logical port in the using state to be in the first state; if a logical port corresponding to the valid enable signal is in an unused state, control a port indicator of a physical port corresponding to the logical port in the unused state to be in the second state; and when the N enable signals are all invalid, control all the channel indicators to be in the second state; if all logical ports corresponding to a physical port are in the using state, control a port indicator of the physical port to be in the first state; if any one logical port corresponding to a physical port is in the unused state, control a port indicator of the physical port to be in the second state.

3. The switch according to claim 2, wherein the switch further comprises a button for manually controlling the states of the channel indicators;

the button for manually controlling the states of the channel indicators is configured to: when being pressed once by a user, send a switching signal to the enable signal controlling module, wherein:

the enable signal controlling module is configured to: generate N enable signals; and when receiving a switching signal from the button, control, according to a preset sequence, one of the N enable signals to be valid and the other enable signals to be invalid, or control all the enable signals to be invalid.

4. The switch according to claim 1, wherein the switch further comprises a commanding unit, wherein:
the commanding unit is configured to send a scheduled switching command to the enable signal controlling module; and
the enable signal controlling module is configured to: generate N enable signals; when receiving a switching signal, control, according to a preset sequence, one of the N enable signals to be valid and the other enable signals to be invalid, or control all the enable signals to be invalid.

5. The switch according to claim 2, wherein the switch further comprises a commanding unit, wherein:
the commanding unit is configured to send a scheduled switching command to the enable signal controlling module; and
the enable signal controlling module is configured to: generate N enable signals; when receiving a switching signal, control, according to a preset sequence, one of the N enable signals to be valid and the other enable signals to be invalid, or control all the enable signals to be invalid.

6. The switch according to claim 3, wherein the switch further comprises a commanding unit, wherein:
the commanding unit is configured to send a scheduled switching command to the enable signal controlling module; and
the enable signal controlling module is configured to: generate N enable signals; when receiving a switching signal, control, according to a preset sequence, one of the N enable signals to be valid and the other enable signals to be invalid, or control all the enable signals to be invalid.

7. The switch according to claim 1, wherein the control component further comprises a timer, wherein:
the timer is configured to set a preset time; and
the enable signal controlling module is configured to: generate N enable signals; each time when the timer reaches the preset time, control, according to a preset sequence, one of the N enable signals to be valid and the other enable signals to be invalid, or control all the enable signals to be invalid.

8. The switch according to claim 2, wherein the control component further comprises a timer, wherein:
the timer is configured to set a preset time; and
the enable signal controlling module is configured to: generate N enable signals; each time when the timer reaches the preset time, control, according to a preset sequence, one of the N enable signals to be valid and the other enable signals to be invalid, or control all the enable signals to be invalid.

9. The switch according to claim 3, wherein the control component further comprises a timer, wherein:
the timer is configured to set a preset time; and
the enable signal controlling module is configured to: generate N enable signals; each time when the timer reaches the preset time, control, according to a preset sequence, one of the N enable signals to be valid and the other enable signals to be invalid, or control all the enable signals to be invalid.

10. The switch according to claim 1, wherein the control component is a complex programmable logic device (CPLD).

11. A method for indicating port states, applied in a switch, wherein the switch comprises M physical ports on its main panel, each physical port of the M physical ports comprising N channels, thus the switch comprises M*N channels, where N≥2 and M≥2, and wherein the main panel is provided with M port indicators one-to-one corresponding to the M physical ports, and the main panel is provided further with N channel indicators, the N channel indicators being respectively corresponding to the N channels of each physical port, and the M port indicators and the N channel indicators are used to indicate states of the M*N channels;
the method comprising: receiving a port state indication signal from a main chip, and parsing the port state indication signal to obtain usage state information of each logical port; wherein the main chip is provided with M*N logical ports corresponding to each of the M*N channels;
generating N enable signals, and controlling at most one enable signal to be valid at any time point; and
controlling the states of the N channel indicators by using the N enable signals, and controlling the state of each port indicator according to the N enable signals and the usage state information of each logical port.

12. The method according to claim 11, wherein the controlling the states of the N channel indicators by using the N enable signals and controlling the state of each port indicator according to the N enable signals and the usage state information of each logical port comprise:
when one of the N enable signals is valid and the other enable signals are invalid, controlling a channel indicator corresponding to the valid enable signal to be in a first state and the other channel indicators to be in a second state; and if a logical port corresponding to the valid enable signal is in an using state, controlling a port indicator of a physical port corresponding to the logical port in the using state to be in the first state; if a logical port corresponding to the valid enable signal is in an unused state, controlling a port indicator of a physical port corresponding to the logical port in the unused state to be in the second state; and
when the N enable signals are all invalid, controlling all the channel indicators to be in the second state, and if all logical ports corresponding to a physical port are in the using state, control a port indicator of the physical port to be in the first state; if any one logical port corresponding to a physical port is in the unused state, control a port indicator of the physical port to be in the second state.

13. The method according to claim 11, wherein the controlling at most one enable signal to be valid at any time point comprises:
when receiving a switching signal manually sent from a user or a scheduled command sent internally from the switch, controlling, according to a preset sequence, one of the N enable signals to be valid and the other enable signals to be invalid or controlling all the enable signals to be invalid.

14. The method according to claim 12, wherein the controlling at most one enable signal to be valid at any time point comprises:
when receiving a switching signal manually sent from a user or a scheduled command sent internally from the switch, controlling, according to a preset sequence, one of the N enable signals to be valid and the other enable signals to be invalid or controlling all the enable signals to be invalid.

15. The method according to claim 11, wherein the controlling at most one enable signal to be valid at any time point comprises:

each time when a preset time is reached, controlling, according to a preset sequence, one of the N enable signals to be valid and the other enable signals to be invalid or controlling all the enable signals to be invalid.

16. The method according to claim 12, wherein the controlling at most one enable signal to be valid at any time point comprises:

each time when a preset time is reached, controlling, according to a preset sequence, one of the N enable signals to be valid and the other enable signals to be invalid or controlling all the enable signals to be invalid.

* * * * *